United States Patent
Shapiro et al.

(10) Patent No.: US 9,898,168 B2
(45) Date of Patent: Feb. 20, 2018

(54) SECURITY SYSTEM ACCESS PROFILES

(71) Applicant: ADT US HOLDINGS, INC., Boca Raton, FL (US)

(72) Inventors: Steven Shapiro, Lake Worth, FL (US); Raymond North, Boca Raton, FL (US); Timothy Albert Rader, Lake Worth, FL (US); Jorge Perdomo, Boca Raton, FL (US); Anne-Marie Rouse, Wellington, FL (US); James Timothy Black, Delray Beach, FL (US)

(73) Assignee: ADT US Holdings, Inc., Boca Raton, FL (US)

( * ) Notice: Subject to any disclaimer, the term of this patent is extended or adjusted under 35 U.S.C. 154(b) by 753 days.

(21) Appl. No.: 14/217,019

(22) Filed: Mar. 17, 2014

(65) Prior Publication Data

US 2014/0282048 A1  Sep. 18, 2014

Related U.S. Application Data

(60) Provisional application No. 61/789,183, filed on Mar. 15, 2013.

(51) Int. Cl.
*G06F 3/048* (2013.01)
*G06F 3/0484* (2013.01)
(Continued)

(52) U.S. Cl.
CPC .......... *G06F 3/0484* (2013.01); *G08B 25/008* (2013.01); *G08B 25/14* (2013.01);
(Continued)

(58) Field of Classification Search
CPC ..... A61B 5/1117; A61B 5/681; A61B 5/0006; A61B 5/0022; A61B 5/02055; G06F 21/31; G06F 3/0484
See application file for complete search history.

(56) References Cited

U.S. PATENT DOCUMENTS 7,853,241 B1 * 12/2010 Harrison .............. G06F 19/327
455/406
8,479,154 B1 * 7/2013 Friedman .................. G06F 8/30
717/100
(Continued)

FOREIGN PATENT DOCUMENTS

WO   2013/019659 A1   2/2013

OTHER PUBLICATIONS

Xu et al.; Physical Proximity and Online User Behaviour in an Indoor Mobile Social Networking Application © 2011; IEEE; 10 pages.*

(Continued)

*Primary Examiner* — Linh K Pham
(74) *Attorney, Agent, or Firm* — Christopher & Weisberg, P.A.

(57) ABSTRACT

An apparatus is provided for controlling access to a premises based system through a user interface device. Criteria are used for establishing a set of system functions that are accessible through the user interface device; and this set of system function is provided by determining an access characteristic associated with the user interface device, comparing the access characteristic to the criteria, and determine the set of system functions to provide the user interface based at least in part on the comparison. The criteria may be defined by an access profile containing a predetermined set of system functions. The access characteristic may include physical location of the user interface device, connection type, device type, and a device identifier. The set of functions may be automatically provided to the user interface device upon with a prompt to arm/disarm the system, and/or control other devices, such as through geo-fencing.

16 Claims, 13 Drawing Sheets

(51) Int. Cl.
  *G08B 25/00* (2006.01)
  *H04W 4/02* (2018.01)
  *H04W 12/08* (2009.01)
  *G08B 25/14* (2006.01)
  *H04L 12/28* (2006.01)
  *H04L 29/08* (2006.01)

(52) U.S. Cl.
  CPC ...... *H04L 12/2818* (2013.01); *H04L 12/2825* (2013.01); *H04L 12/2829* (2013.01); *H04W 4/021* (2013.01); *H04W 12/08* (2013.01); *H04L 67/125* (2013.01); *H04L 67/30* (2013.01); *H04L 2012/285* (2013.01); *H04L 2012/2841* (2013.01)

(56) References Cited

U.S. PATENT DOCUMENTS

| | | | | |
|---|---|---|---|---|
| 8,588,765 | B1* | 11/2013 | Harrison | G06F 19/322 455/424 |
| 8,973,088 | B1* | 3/2015 | Leung | H04L 63/00 726/1 |
| 9,055,387 | B1* | 6/2015 | Boyle | H04W 4/003 |
| 2005/0233744 | A1* | 10/2005 | Karaoguz | H04W 12/08 455/432.3 |
| 2006/0099971 | A1* | 5/2006 | Staton | G08C 17/00 455/456.6 |
| 2007/0256105 | A1* | 11/2007 | Tabe | G08B 13/19697 725/78 |
| 2008/0316730 | A1* | 12/2008 | Diederiks | G06F 3/0481 362/85 |
| 2009/0070681 | A1* | 3/2009 | Dawes | G06F 17/30873 715/736 |
| 2009/0280863 | A1* | 11/2009 | Shin | G06F 1/1624 455/557 |
| 2010/0023865 | A1* | 1/2010 | Fulker | G06F 3/04817 715/734 |
| 2010/0138764 | A1* | 6/2010 | Hatambeiki | G08C 17/02 715/765 |
| 2010/0159879 | A1* | 6/2010 | Salkini | H04L 63/10 455/411 |
| 2010/0277300 | A1 | 11/2010 | Cohn et al. | |
| 2011/0071656 | A1 | 3/2011 | McKiel, Jr. | |
| 2012/0075588 | A1 | 3/2012 | Suga | |
| 2012/0154138 | A1* | 6/2012 | Cohn | G08B 25/004 340/501 |
| 2012/0280790 | A1* | 11/2012 | Gerhardt | G07C 9/00309 340/5.61 |
| 2013/0029630 | A1* | 1/2013 | Salkini | H04L 63/10 455/404.1 |
| 2013/0057695 | A1* | 3/2013 | Huisking | H04N 7/186 348/156 |
| 2013/0057912 | A1* | 3/2013 | Park | H04L 63/102 358/1.15 |
| 2013/0072226 | A1* | 3/2013 | Thramann | H04W 4/028 455/456.1 |
| 2013/0167196 | A1* | 6/2013 | Spencer | H04W 8/22 726/3 |

OTHER PUBLICATIONS

International Search Report and Written Opinion dated Aug. 5, 2014 for International Application Serial No. PCT/US2014/030764, filed Mar. 17, 2014, consisting of 11 pages.

* cited by examiner

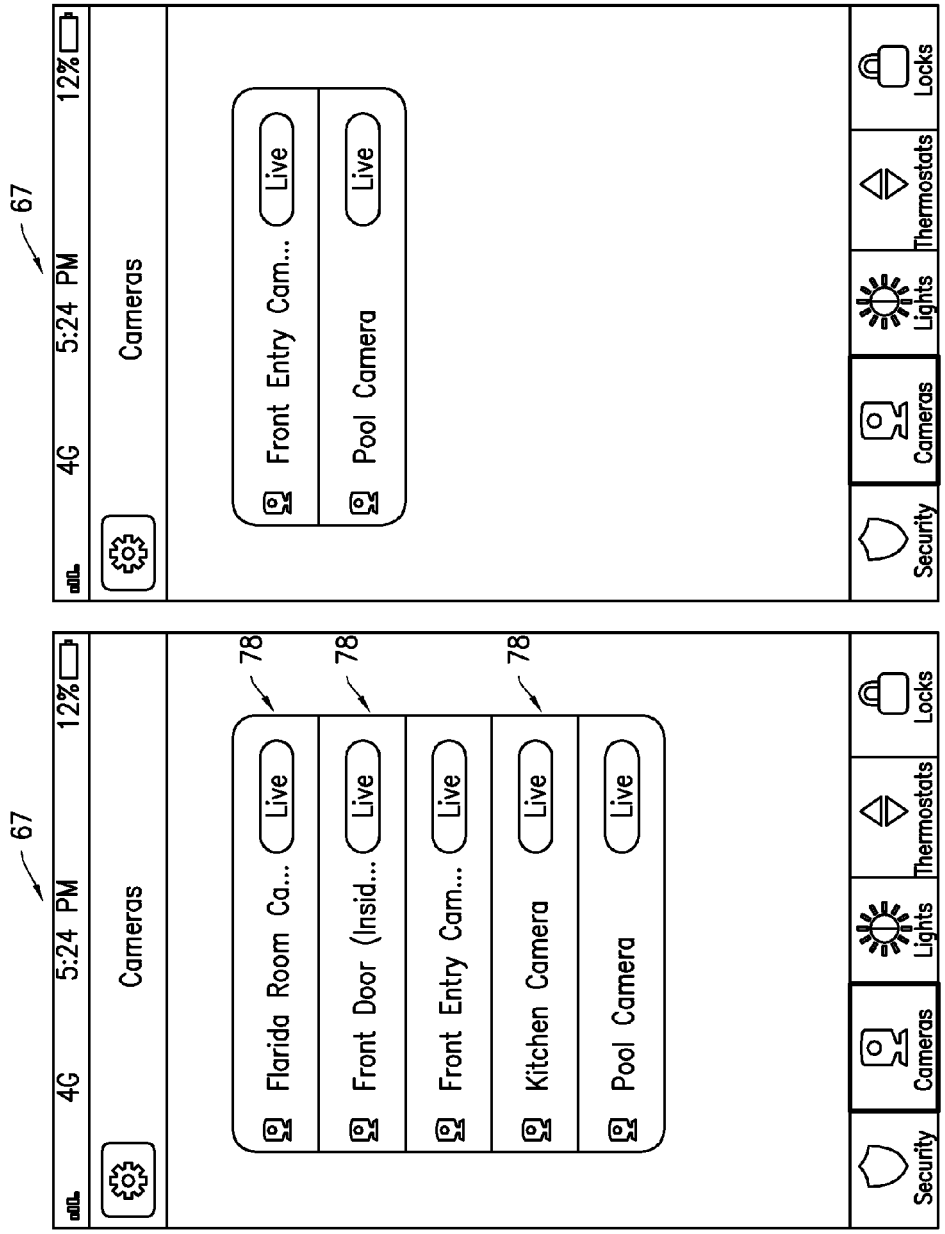

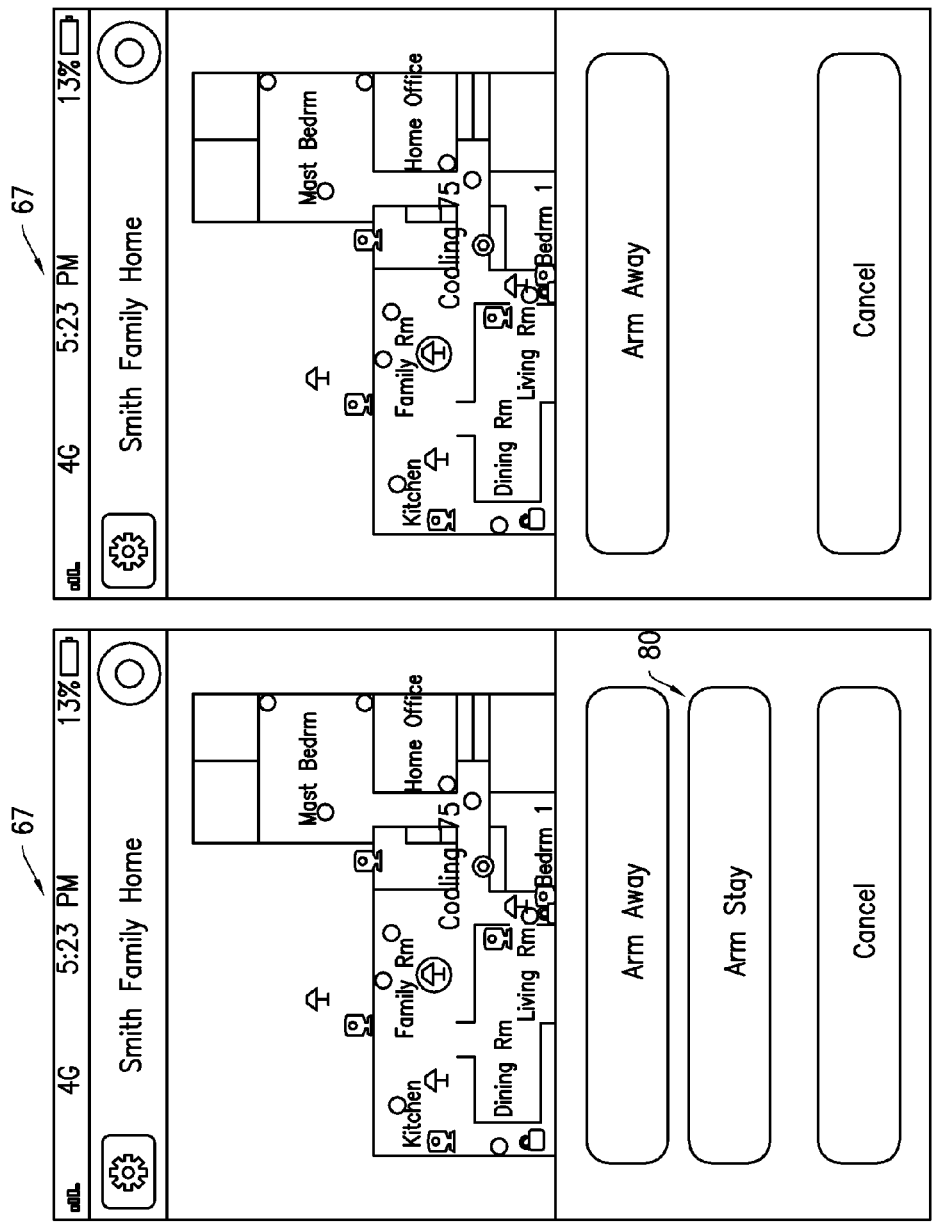

SECURITY SYSTEM ACCESS PROFILES

CROSS-REFERENCE TO RELATED APPLICATION

This application is related to and claims priority to U.S. Provisional Patent Application Ser. No. 61/789,183, filed Mar. 15, 2013, entitled "SECURITY SYSTEM ACCESS PROFILES", the entirety of which is incorporated herein by reference.

STATEMENT REGARDING FEDERALLY SPONSORED RESEARCH OR DEVELOPMENT

N/A

FIELD OF THE INVENTION

The invention relates to premises based systems that centrally control a plurality of separate devices, and in particular to making different system functions available to a user interface device.

BACKGROUND OF THE INVENTION

The demand for systems that monitor a variety of conditions, such as monitoring homes and businesses for alarm conditions, allowing users to centrally control various devices (such as thermostats, switches, cameras, appliances, etc.), monitors medical conditions, and the like continues to grow as more home and business owners seek better control over their premises and to protect it from various hazards and threats. Such threats include intrusion, fire, carbon monoxide and flooding, among others dangers, which may be monitored locally or remotely by the users, and may also be reported to a monitoring station.

These systems typically employ a control panel and/or gateway that receive "event" (such as triggering alarms) and other information from various sensors and devices, and are used to operate those devices. This may be done locally by the user, or remotely over a network such as via a plain old telephone service (POTS) line, IP Broadband connections, or cellular radio through a user interface—such as a keypad, touch screen, or application operating on a smart phone or tablet. In the case of certain alarm events, a remote monitoring center may also take appropriate action, such as notifying emergency responders.

Such systems may include conventional home security systems and Personal Emergency Response Systems ("PERS"), which are typically professionally installed and professionally monitored safety systems, more recent all-in-one ("AIO") security panels, or do-it-yourself ("DIY") security kits and self-contained units (where the various sensors, a control panel, and remote communications are integrated in a single device) have emerged that can be set-up/configured and taken down/relocated by the homeowner.

The aforementioned systems are typically limited to controlling and monitoring life safety features, such as intrusion and fire detection. In order to add life style features (such as lighting control, temperature control and remote viewing of video), an additional controller is often needed and this life style functionality is often are typically operated and managed through a different provider and/or remote system than those used for monitoring life safety. Users often access this system through a separate user interface than the conventional security system—typically a mobile application—through certain security system functionality (particularly ARM/DISARM) may be available through a common interface.

But such systems provide the same life safety and life style functionality to the user interface each time a user accesses the system, irrespective of circumstances. Moreover, such systems are typically passive in that they do not prompt the user for action based upon certain circumstances, but instead only provide such prompts to a user when the user accesses the use interface.

SUMMARY OF THE INVENTION

The invention advantageously provides differing access to system functions of a premises based system through a user interface depending on circumstances.

According to one embodiment of the invention, an apparatus for controlling access to a premises based system is provided. A communication subsystem is configured to communicate with at least one user interface device through which a user may access functions relating to the premises based system. A memory is configured to store access criteria for establishing a set of system functions that is accessible through the user interface device. A processor is configured to determine at least one access characteristic associated with the user interface device, compare the determined access characteristic to the criteria and determine the set of system functions to provide the user interface based at least in part on the comparison.

According to another embodiment of this aspect, the criteria is defined at least in part by an access profile containing a pre-determined set of system functions. According to another embodiment of this aspect, the device type is one of a personal computer, a wireless touch screen, a tablet device, and a mobile phone. According to another embodiment of this aspect, the at least one access characteristic includes at least one selected from the group consisting of a proximate physical location of the user interface device, a connection type for communicating with the user interface device, a device type for the user interface device, and an identifier for the user interface device. According to another embodiment of this aspect, the proximate physical location is determined using GPS. According to another embodiment of this aspect, the identifier is at least one of a media access control (MAC) address, an international mobile station equipment (IMEI) number, and an identifier generated by software operating on the user interface device. According to another embodiment of this aspect, the connection type includes one of Bluetooth, ZigBee, Z-Wave, Wi-Fi, and cellular.

According to another embodiment of this aspect, the set of functions is automatically provided to the user interface device upon determination of the access characteristic, and includes a prompt for the user to perform at least one of arm the premises based system, disarm the premises based system, unlock a door of the premises, and turn on at least one light within the premises. According to another embodiment of this aspect, the determination of the access characteristic incorporates geo-fencing based at least one of proximate physical location and network connection type. According to another embodiment of this aspect, the communication subsystem is configured to enable communication between the premises based system and the user interface device using a particular connection type based on the determined access characteristic.

According to another embodiment of the invention, a method for an apparatus for a premises based system is provided. At least one user interface device is communicated with through which a user may access functions relating to the premises based system. Access criteria for establishing a set of system functions that is accessible through the user interface device is stored. At least one access characteristic associated with the user interface device is determined. The determined access characteristic are compared to the criteria. The set of system functions to provide the user interface are determined based at least in part on the comparison.

According to another embodiment of this aspect, the criteria is defined at least in part by an access profile containing a pre-determined set of system functions. According to another embodiment of this aspect, the device type is one of a personal computer, a wireless touch screen, a tablet device, and a mobile phone. According to another embodiment of this aspect, the at least one access characteristic includes at least one selected from the group consisting of a proximate physical location of the user interface device, a connection type for communicating with the user interface device, a device type for the user interface device, and an identifier for the user interface device. According to another embodiment of this aspect, the proximate physical location is determined using GPS. According to another embodiment of this aspect, the identifier is at least one of a media access control (MAC) address, an international mobile station equipment (IMEI) number, and an identifier generated by software operating on the user interface device.

According to another embodiment of this aspect, the connection type includes one of Bluetooth, ZigBee, Z-Wave, Wi-Fi, and cellular. According to another embodiment of this aspect, the set of functions is automatically provided to the user interface device upon determination of the access characteristic, and includes a prompt for the user to perform at least one of arm the premises based system, disarm the premises based system, unlock a door of the premises, and turn on at least one light within the premises. According to another embodiment of this aspect, the determination of the access characteristic incorporates geo-fencing based at least one of proximate physical location and network connection type. According to another embodiment of this aspect, the communication subsystem is configured to enable communication between the premises based system and the user interface device using a particular connection type based on the determined access characteristic.

According to another embodiment of the invention, an apparatus for controlling access to a premises based system is provided. A communication subsystem is configured to communicate with at least one user interface device through which a user may access functions relating to the premises based system. A memory is configured to store access criteria for establishing a set of system functions that is accessible through the user interface device. A processor is configured to determine at least one access characteristic associated with the user interface device that includes a connection type for the user interface device, compare the determined access characteristic to the criteria and determine the set of system functions to provide the user interface device based at least in part on the comparison.

According to another embodiment of this aspect, the processor is configured to automatically authenticate the user interface device with the control apparatus based on comparison of the determined access characteristic and the access criteria. According to another embodiment of this aspect, the processor is further configured, based on the comparison of the determined access characteristic and the access criteria, to automatically one of prompt the user to perform, at least one of arm the premises based system, disarm the premises based system, unlock a door of the premises, and turn on at least one light within the premises.

According to another embodiment of the invention, a user interface device is configured to communicate with a control unit at a premises. A processor is configured to cause a request message for access to a set of system functions to be transmitted to the control unit. The request message includes at least one of device type, location type and connection type of the user interface device. The processor is configured to determine a response to the request has been received and provide access to system functions based at least in part on the received response. The received response indicate the set of system functions accessible by the user interface device.

According to another embodiment of this aspect, communication with the control unit is local to the premises when the user interface device is located at the premises, local communication allowing the user interface device to control the operation of the control unit.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein:

FIGS. 13 and 14 are example views of an interface and/or display on a user interface device providing different external camera functions in accordance with the principles of the invention;

FIGS. 15 and 16 are example views of an interface and/or display on a user interface device providing different arming functions in accordance with the principles of the invention;

DETAILED DESCRIPTION OF THE INVENTION

Figure 1:
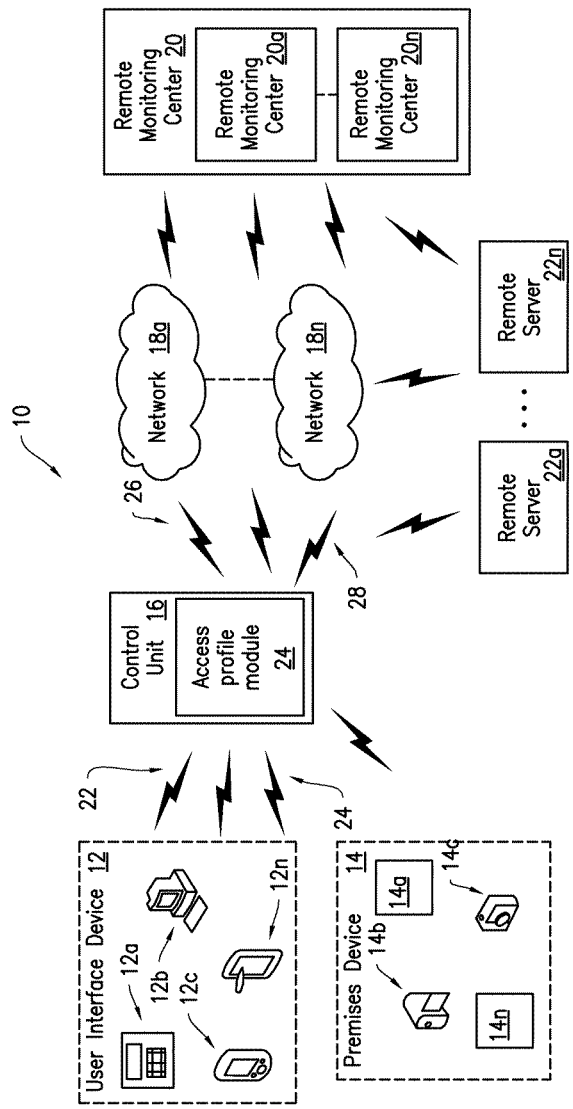
FIG. 1 is a block diagram of a premises based system that makes different system functions available to devices, constructed in accordance with the principles of the invention.

The invention advantageously provides differing access to system functions of a premises based system such as a security control system, and components have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein. While the invention is described herein with respect to a security system, the invention is not limited to such. It is contemplated that the processes and functions described herein may be applied to any premises based system that centrally controls a plurality of separate devices.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements there is shown in FIG. 1 a system constructed in accordance with the principles of the invention and designated generally as "10." System 10 may include one or more user interface devices 12a to 12n (collectively referred to as "user interface device 12"), one or more premises devices 14a to 14n (collectively referred to as "premises device 14"), control unit 16, one or more networks 18a to 18n (collectively referred to as "network 18"), one or more remote monitoring centers 20a to 20n (collectively referred to as "remote monitoring center 20") and one or more remote servers 22a to 22n, communicating with each other directly and/or via network 18.

User interface device 12 may be any device that allows a user to communicate with control unit 16. User interface device 12 may be a portable control keypad/interface (touch screen) 12a, desktop/laptop computer 12b, mobile phone 12c and tablet 12n, among other devices that allow a user to interface with control unit 16. For wireless devices, user interface device 12 may communicate at least with control unit 16 using one or more wireless communication protocols well known to those of ordinary skill in the art. For example, portable control keypad 12a may communicate with control unit 16 via BLUETOOTH, a ZigBee based communication link 22, e.g., network based on Institute of Electrical and Electronics Engineers (IEEE) 802.15.4 protocols, and/or Z-wave based communication link 24, or over the premises' local area network, e.g., network based on Institute of Electrical and Electronics Engineers (IEEE) 802.11 protocols. Other communication protocols may be used and may be directional or bi-directional and proprietary and not per any published standard. User interface device 12 is discussed in detail with respect to FIG. 3.

Premises devices 14 may include one or more types of sensors, control and/or image capture devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with control unit 16 via proprietary wireless communication protocols and may also use Wi-Fi, both of which are known in the art. Those of ordinary skill in the art will also appreciate that various additional sensors and control and/or image capture devices may relate to life safety or life style depending on both what the sensors, control and image capture devices do and how these sensors, control and image devices are used by system 10. One of the advantages of the invention is the ability to use any of these devices irrespective of whether they are life safety or life style.

Figure 8:
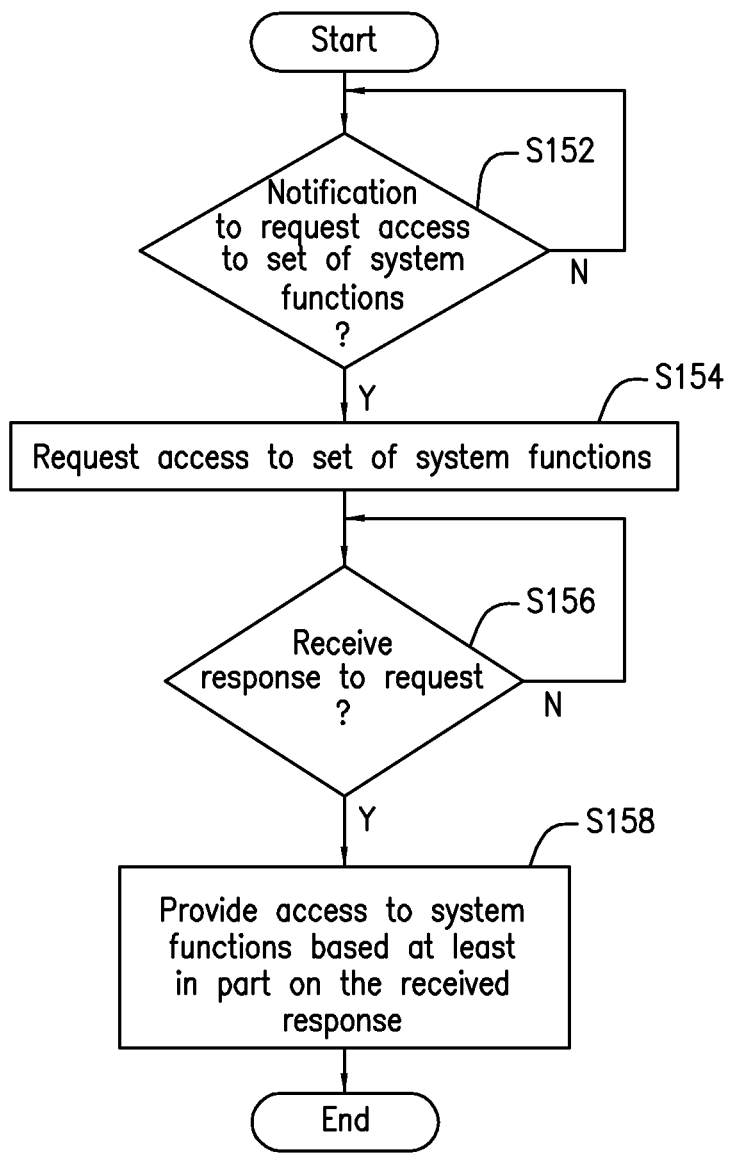
FIG. 8 is a flow chart of an example request process for requesting an access profile in accordance with the principles of the invention.

Control unit 16 may provide management functions such as access management, power management, security system management, premises device management and alarm management, among other functions. In particular, control unit 16 may include access profile module 24 that allows user interface device 12 to access various system functions. Access profiles module 24 may include, for example, various access criteria used for determining a set of functions to be provided to user interface device 12, as discussed in detail with respect to FIGS. 2, 3 and 8.

Control unit 16 may manage one or more life safety and life style features. Life safety features may correspond to security system functions and settings associated with premises conditions that may result in life threatening harm to a person such as carbon monoxide detection and intrusion detection. Life style features may correspond to security system functions and settings associated with video capturing devices and non-life threatening conditions of the premises such as lighting and thermostat functions. Example control unit 16 components and functions are described detail with respect to FIG. 2.

Control unit 16 may communicate with network 18 via one or more communication links. In particular, the communications links may be broadband communication links such as a wired cable modem or Ethernet communication link 26, and digital cellular communication link 28, e.g., long term evolution (LTE) based link, among other broadband communication links known in the art. Broadband as used herein may refer to a communication link other than a plain old telephone service (POTS) line such as wired and/or wireless communication links including Wi-Fi and/or other technologies. Ethernet communication link 26 may be an IEEE 802.3 based communication link. Network 18 may be a wide area network, local area network, wireless local network and metropolitan area network, among other networks known in the art. Network 18 provides communications between control unit 16 and remote monitoring center 20.

System 10 may include remote monitoring center 20 that is capable of performing monitoring, configuration and/or control functions associated with control unit 16. For example, remote monitoring center 20 may include a remote life safety monitoring center that monitors life safety features associated with control unit 16 in which the remote monitoring center 20 receives life safety data from control unit 16. For example, with respect to fire and carbon monoxide detectors/sensors, life safety data may include at least one carbon monoxide readings, smoke detection reading, sensor location and time of reading, among other related to these detectors that may be communicated with remote monitoring center 20. In yet another example, with respect to a door contact detector, life safety data may include at least one of sensor location and time of detection, among other data related to the door contact detection that may be communicated with remote monitoring center 20.

Alarm event data from the premises may be used by the remote monitoring center in running through various life safety response processes in notifying the owner of the premises, determining whether an actual alarm event is occurring at the premises, and notifying any appropriate response agency (e.g., police, fire, emergency response, premises owner, other interested parties, etc.).

The same or separate remote monitoring center 20 may also include a life style system/service that allows for various life style features associated with control 16. The remote life style system may receive life style data from control unit 16. For example, with respect to temperature control, life safety data may include thermostat readings. In yet another example, with respect to video capture devices, life style data may include at least one of captured images, video, time of video capture and video location, among other data related to video capture devices that may be communicate with remote monitoring center 20. Remote monitoring center 20 may also provide updates to control unit 16 such as updates to features associated with life safety and/or life style operating system. Those of ordinary skill in the art will appreciate that video and other data may also be used by the life safety monitoring center.

System 10 may include remote server 22 that provides data to control unit 16, among to other devices in system 10. For example, remote server 22 may also store the aforementioned access criteria, such as one or more access profiles for one or more user devices and/or users that may include a predetermined set of functions to be provided based on determination of at least one access characteristic of user interface device 12, and may provide the stored access criteria and data to control unit 16 and/or user interface device 12. Access criteria may include a defined predetermined set of system functions that is made available for each access profile as describe in detail below with respect to FIG. 2. Remote server 22 may provide system updates to control unit 16 and other information as discussed above with respect to remote monitoring center 20.

Figure 2:
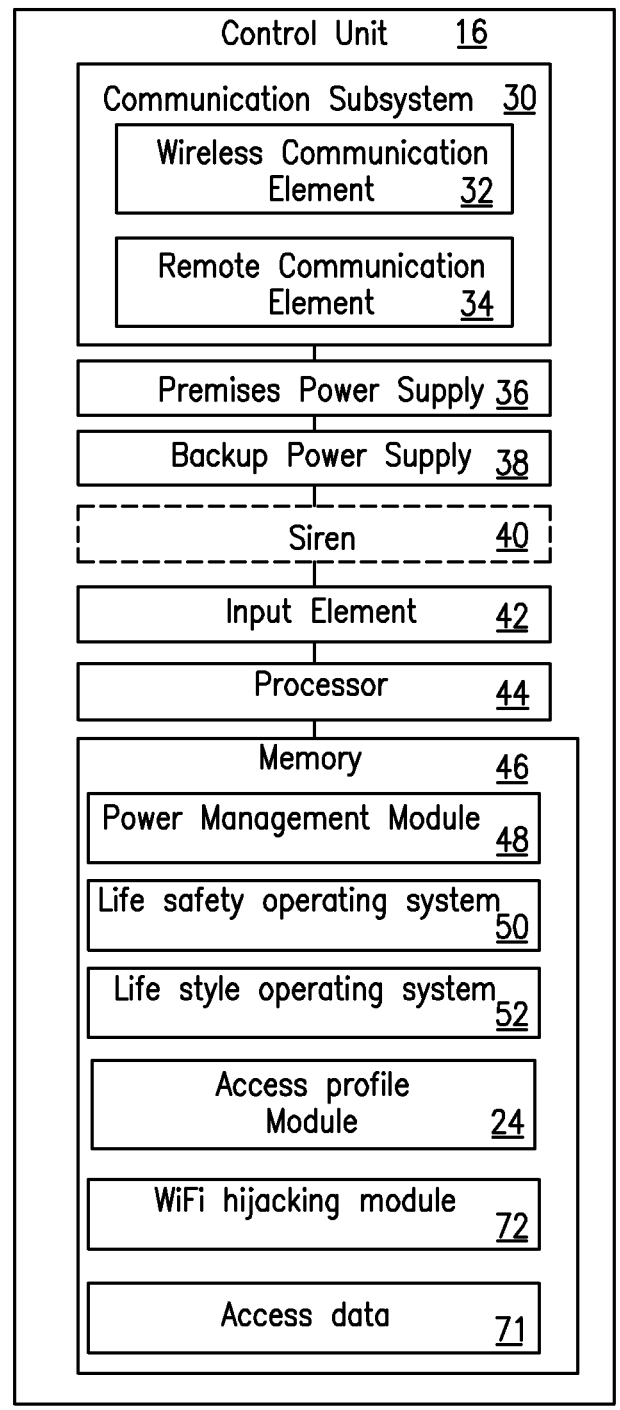
FIG. 2 is a block diagram of a control unit constructed in accordance with the principles of the invention.

An example control unit 16 for managing a premises based system is described with reference to FIG. 2. Control unit 16 may include communication subsystem 30 that is configured to provide communications with user interface device 12, premises device 14 and network 18. Communication subsystem 30 is configured to communicate with at least one user interface device through which a user may access functions relating to the premises based system, as described herein. Communication subsystem 30 may include wireless communication element 32 and remote communication element 34. Wireless communication element 32 provides wireless communication with user interface device 12 and premises device 14. Wireless communication element 32 may support one or more wireless communication protocols such as BLUETOOTH, ZigBee, Z-wave and Wi-Fi, e.g., IEEE 802.11, among others wireless communications protocols that support wireless data transfer.

Wireless communication element 32 may be composed of one or more hardware components in which each hardware component is configured to provide wireless communication using a specific protocol. For example, wireless communication element 32 may include a ZigBee hardware component configured to provide ZigBee based communications and a Z-wave hardware component configured to provide Z-wave based communications. Other hardware components may be included such as to provide one or more other communication protocols. The hardware components associated with wireless communication element 32 may be internal components within control unit 16 such that these features are built-in or standard features. Alternatively, any one or more of the hardware components associated with wireless communication element 32 may be external components that may be replaced by a user, homeowner or installer. For example, the ZigBee and Z-wave hardware component modules may be internal components while the Wi-Fi hardware component may be an external component that allows for upgrading and/or an internal component. Wireless communication element 32 may broadcast a wireless signal so that user interface device 12 may connect directly to control unit 16. For example, wireless communication element 32 may provide a Wi-Fi encrypted service set identifier (SSID) and path for communication with multiple user interface devices 12.

By supporting a plurality of wireless communication protocols, wireless communication element 32 enables control unit 16 to be used with a variety of user interface devices 12 and premises devices 12 that are designed to work using only a specific wireless communication protocol. Supporting a plurality of wireless communication protocols allows easy upgrading of existing user interface device 12 and premises device 14, and for control unit 16 integration with various equipment venders that may incorporate different wireless protocols. Wireless communication element 32 may provide two-way voice communication with user interface device 12, which is then communicated with remote monitoring center 20. For example, wireless communication element 32 may support voice over internet protocol (VoIP) based communications. In one embodiment, component parts of wireless communication element 32, e.g., an IEEE 802.11 communication module, may also be past of remote communication element so that the wireless communication protocols, e.g., IEEE 802.11 protocols, can be used to communicate with remote monitoring center 20. In other words, one or more specific communication modules of wireless communication element 32 can also be part of remote communication element 34.

Remote communication element 34 is configured to provide broadband communications with remote monitoring center 20 via network 18. For example, remote communication element 34 may be an Ethernet based hardware component that provides communication with network 18. Alternatively or in addition to Ethernet based hardware component, remote communication element 34 may include a Wi-Fi (IEEE 802.11) hardware component that provides communication with a home or other premises network, e.g., a home wireless network, and may utilize some of the same components as wireless communication element 32. The remote communication element 34 may also include a cellular radio hardware component that provides communications with at least one cellular network such as an LTE based cellular network. Control unit 16 may use Ethernet communication link 26 as a primary communication link such that the cellular communication link is used for broadband communications when the Ethernet or primary communication link is not functioning properly such as during a power outage where a home network is unavailable, i.e., home network router has no power.

Control unit 16 may include premises power supply 36 that is configured to provide power to control unit 16. For example, premises power supply 36 may provide power to control unit 16 via a home alternating current (AC) power outlet or other power outlets that are known in the art. Premises power supply 36 may be a primary power supply such that control unit 16 operates using power from the premises power supply 36 when available. Control unit 16 may also include back-up power supply 38 that provides power during premises power supply failure. Back-up power supply 38 may include one or more disposable or rechargeable batteries that are configured to provide enough power to operate control unit 16 for first predetermined amount of time and activate siren 40 for a second predetermined amount of time, e.g., a user can access the security system for at least twenty-four hours while control unit 16 is power by back-up power supply 38 while the siren can be activated and operate after the twenty-four hour period.

Siren 40 may be an eighty-five decibel (dB) siren, among other audible devices known in the art. Siren 40 may be an optional component in control unit 16 such that audible alerts are generated by user interface device 12, e.g., portable control keypad/interface 12a, and not control unit 16. Moreover, control unit 16 may include at least one universal serial bus port (USB) to receive power from a laptop or other device with a USB interface. Other port types capable of providing power to control unit 16 may be used based on design need.

Input element 42 may be configured to receive input data from a user. For example, input element 42 may be a ten number keypad that enables a user to arm and disarm system 10. Input element 42 allows for an alternative or back-up way of arming and disarming system, for example, when no user interface device 12 is available to a user. Other input elements may be used as are known in the art. Control unit 16 may include one or more indicators such as light emitting diodes (LEDs) that may indicate the status of control unit 16. For example, a first LED is turned on when control panel is powered, a second LED is turned on when the system is armed or disarmed, a third LED is turned on when an internet protocol connection is connected, a fourth LED may be turned on when the cellular connection has sufficient strength and the first LED may flash during low power conditions, among other LED and LED on/off may be used based on design need. Processor 44 may be a central processing unit (CPU) that executes computer program instructions stored in memory 46 to perform the functions described herein.

Memory 46 may include non-volatile and volatile memory. For example, non-volatile memory may include a hard drive, memory stick, flash memory and the like. Also, volatile memory may include random access memory and others known in the art. Memory 46 may store power management module 48, life safety operating system 50 and life style operating system 52, among other data and/or modules. Power management module 48 includes instructions, which when executed by processor 44, cause processor 44 to perform the process described herein, such as the power management process, discussed in detail with reference to FIG. 5. Life safety operating system is configured to provide life safety features associated with system 10. Life style operating system 52 is configured to provide life style features associated with system 10. In particular, processor 44 may be configured to run both life safety operating system 50 and life style operating system 52 such that separate processors are not needed to run both operating systems. This single processor configuration reduces cost while still providing both life safety and life style features. Memory 46 may include access profiles module 24 configured to determine system functionality to make available to a particular user and/or user interface device 12.

Access profiles module 24 may contain access criteria that are used to determine the set of function provided to user interface device 12 which may be implemented, i.e., is authorized to access specific system functions. The access criteria may be one or more access profiles that may correspond to a predefined set of system functions to make available to user interface device 12 such that one access profile may allow a user to access different system functions than another access profile, even for the same user and for the same physical system. Access profiles module 70 includes instructions, which when executed by processor 44, cause processor 44 to perform the process described herein, such as the access profiles process, discussed in detail with reference to FIG. 7. Criteria within access data 71 may define the set of system functions for each access profile, thereby defining which system functions are made available for each access profile. Access data 71 may be configured by the premises service provider, user and/or premises owner, among other users authorized to configure control unit 16. Alternatively or in addition to access data 71 being stored in memory 46, access data 71 may be stored in remote server 22.

The criteria in access data 71 may include, for example, different functionality, or sets of functionality, to provide based on a plurality of access characteristics in which each access profile is associated with one or more access characteristics. Access characteristics may include proximate physical location, device type, device identifier, connection type (such as the aforementioned local and remote communication protocols; e.g., BLUETOOTH, ZigBee, Z-Wave, Wi-Fi, cellular, etc.), user type, time of day, and current state of the system (armed or disarmed for example), among other attributes. The location type may indicate user interface device 12 is at the premises, proximate the premises (i.e., within a predefined distance from the premises) and/or remote from the premises (i.e., not within a predefined distance from the premises), among other location attributes. Location of user interface device 12 may be determined by at least one of control unit 16, network 18 and/or user interface device 12 based at least in part on at least one of triangulation, global position system (GPS), Wi-Fi communications and cellular base station communications, among other methods for determining position of an electronic device.

Device type may indicate the type of electronic device of user interface device 12. For example, device type may indicate user interface device 12 that requested access to system functionality is one of laptop computer, desktop computer, mobile phone, smartphone tablet device and personal digital assistance (PDA), among electronic device type. Each device type may be associated with a predefined number of resources such as computational resources and/or display availability, among other resources. Connection type may indicate a general category of commination link and/or actual data throughput. For example, connection type may indicate user interface device 12 is communicating with control unit 16 via a wired broadband connection, high speed wireless connection or low speed wireless connection, among other communication link.

Device identifiers may be any mechanism for identifying a particular physical device (which may or may not be associated with user information stored in access profile module 24, or elsewhere in control unit 16 or remote server 22. Examples of such identifiers include an IP address for the device (such as on the local area network), a media access control (MAC) address, the International Mobile Station Equipment Identity (IMEI number) for a mobile phone or other device, or an identifier generated by software operating on the user interface device, for example such as is incorporated into APPLE's iOS and GOOGLE's Android OS, and may be incorporated into apps operating thereon.

Memory 46 may include a Wi-Fi hijacking module 72 that varies control unit 16 settings when processor determines an unauthorized device has connected to control unit 16 via Wi-Fi. For example, Wi-Fi hijacking module 72 may shutdown Wi-Fi and/or move to low power RF such that user interface device 12 and/or premises device 14 can still communicate with control panel 16. Wi-Fi hijacking module 72 may include instructions, which when executed by processor 44, cause processor 44 to perform the process described herein, such as the Wi-Fi hijacking process. Memory 46 may include an auto enrollment module (not shown) that is configured to cause processor 44 to search, wirelessly, for user interface device 12 and premises device 14 located within or near the premises. The auto enrollment module may cause processor 44 to forward information associated with the found devices 12 and 14 to remote monitoring center 20 such that remote monitoring center 20 may push enrollment data to control unit 16 to facilitate configuration. Control unit 16 may use the enrollment data configured the security system such that the system operates using the found devices 12 and/14. Auto enrollment module reduces installation time as the devices 12 and/14 are automatically found and enrolled for use by control unit 16.

In one example, of the benefits provided by the invention, a person may be worried that he/she will forget to turn off the alarm when he/she comes home especially when the garage doors are contacted, i.e., monitored by system 10, such that when the garage door is open, it starts the entry delay time to turn off or disarm the security system before the alarm is triggered. Processor 44 may be further configured to cause a reminder notification to be sent to a Wi-Fi enabled device that is in the range of a connection type as the Wi-Fi network at the premises to prompt the user to turn off or disarm the system upon entering the premises being monitored by system 10. For example, a user's mobile device may come into range of a security Wi-Fi network of the security system when the user is entering the garage or walking through the door such that processor 44 causes a prompt to be sent to the user's mobile device to remind the user to disarm the system now that the user has arrived.

The reminder notification may be a message and/or audible reminder. In the case where user interface device 12 is a mobile device, it may also be a command for a user interface application on user interface device 12 to activate display 67, providing a set of functionality for arming the system, such as a prompt for the user's PIN and a "disarm" button.

Furthermore, when the user's mobile device is no longer in Wi-Fi range of the security system for a predefined period of time and the system is not armed, processor 44 can cause a reminder notification to be send to the user's mobile device as a prompt notifying the user that the system is not armed, e.g., "arm" button. Using Wi-Fi technology with, in range, out of range, as the trigger for notification, ensures the user is in close proximity to security system before certain actions are taken and notifications made. Using secure encrypted Wi-Fi network and Wi-Fi device authentication ensures a reliable device to system identification, and provides a secure reliable connection from the user's device to the security system.

Figure 3:
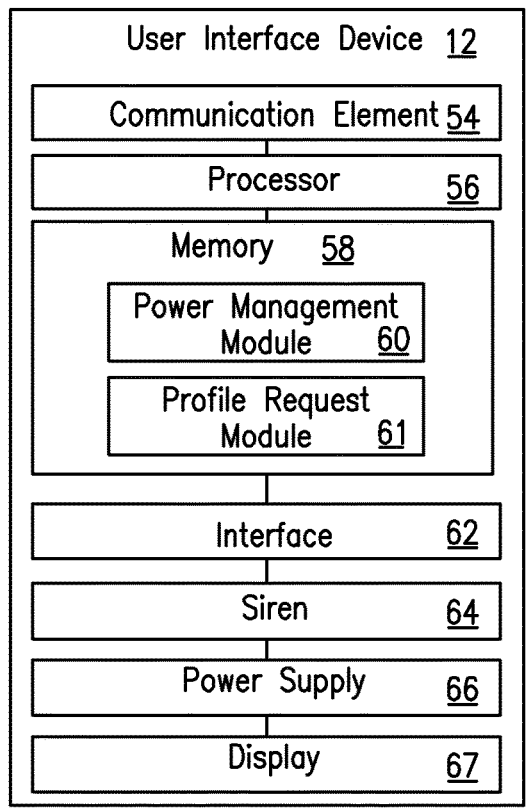
FIG. 3 is a block diagram of a user interface device constructed in accordance with the principles of the invention.

An example user interface device 12 for providing local control and configuration data is described with reference to FIG. 3. User interface device 12 may include a portable control keypad/interface 12a, personal computer 12b, mobile device 12c and tablet computer 12n, among other devices. User interface device 12 includes communication element 54 that is configured to communicate with control unit 16 via at least one wireless communication protocol such as ZigBee, Z-wave and Wi-Fi, among other protocols known in the art. User interface device 12 may include processor 56 and memory 58 that correspond to control unit 16 components, with size and performance being adjusted based on design need. Processor 56 performs the functions described herein with respect to user interface device 12.

Figure 6:
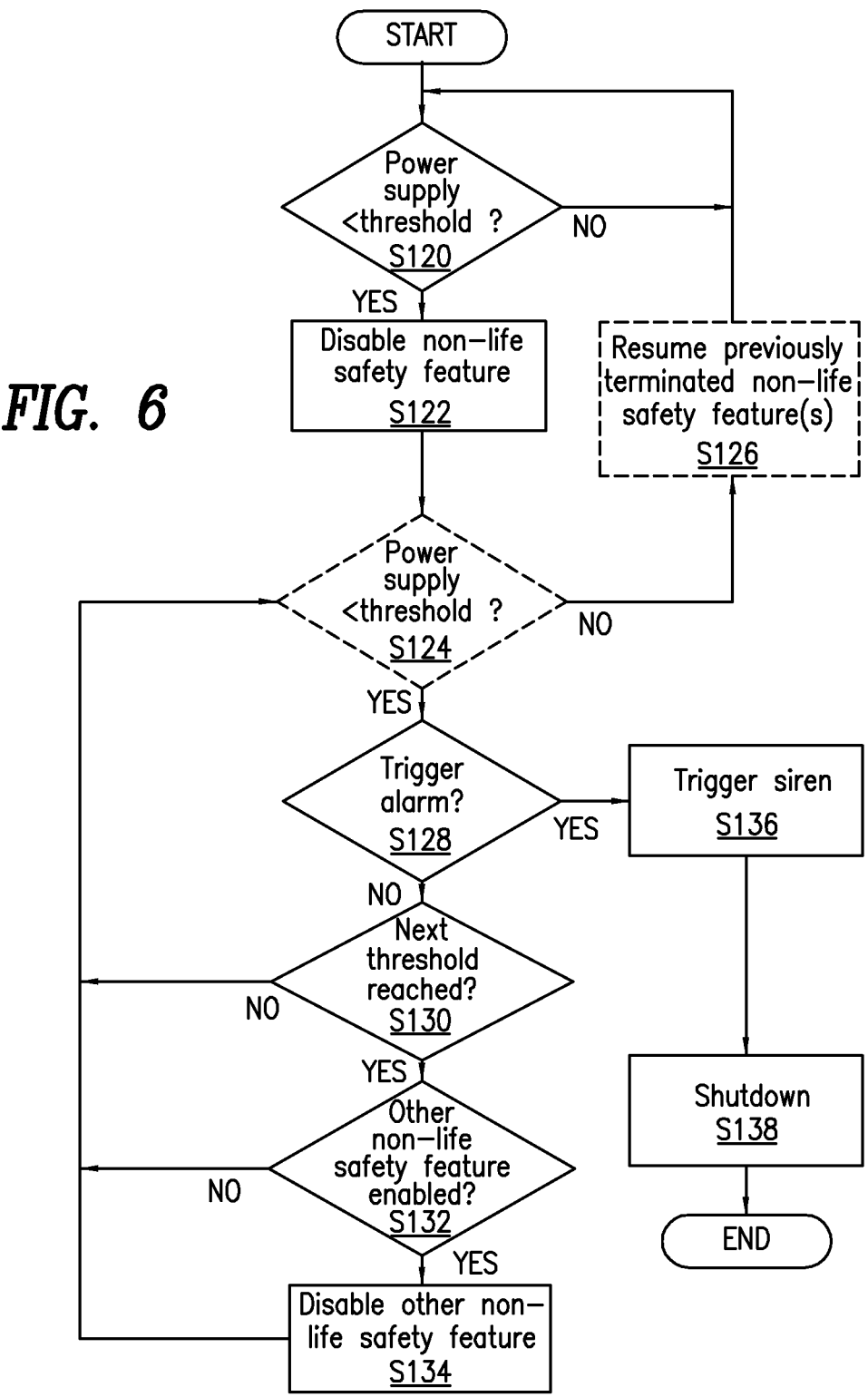
FIG. 6 is a flow chart of an example user interface device power management process of the invention in accordance with the principles of the invention.

Memory 58 may include power management module 60 in which power management module 60 includes instructions, which when executed by processor 56, cause processor 56 to perform the process described herein, such as the power management process, discussed with respect to FIG. 6. Memory 58 may include profile request module 61 that allows user interface device 12 to request an access profile. Profile request module 61 includes instructions, which when executed by processor 56, cause processor 56 to perform the process described herein, such as the profile request process, discussed with respect to FIG. 8.

Memory 58 may store other modules and data based on design need. Interface 62 may be a user interface shown on the display of user interface device 12 that is configured to receive user inputs. For example, interface 62 may receive local control and configuration data input from user.

User interface device 12 may include siren 64 such as an eighty-five dB siren or other audible device(s) known in the art. User interface device 12 may include power supply 66 for supplying power to user interface device 12. Power supply 66 may include one or more rechargeable and/or disposable batteries, among other types of batteries that are well known in the art. Moreover, user interface device 12 may be powered via a universal serial bus (USB), have an interface that allows the connection of an external power adapter/recharger, and/or other connection type. User interface device may include display 67 for displaying information to user of user interface device 12.

Figure 4:
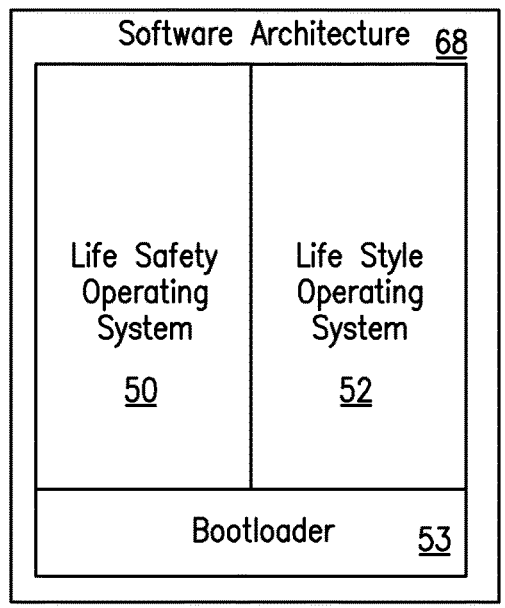
FIG. 4 is a block diagram of a software architecture of the control unit, constructed in accordance with the principles of the invention.

Example software architecture 68 of control unit 16 is described with reference to FIG. 4. In particular, software architecture 68 may include life safety operating system 50, life style operating system 52 and bootloader 53, among other software components relates to security feature management and operation of control unit 16. Life safety operating system 50 and life style operating system 52 are configured to run in control unit 16 in which the life safety operating system 50 and life style operating system 52 run in a virtual machine configuration. The virtual machine configuration allows a single processor such as processor 44 to separately run the life safety operating system 50 while updating life style operating 52 without negatively affecting features associated with life safety operating system 50, i.e., life safety features remain functioning while life style features are updated. The converse is also contemplated. Bootloader 53 is used to load the run time environment for operating systems 50 and 52.

Figure 5:
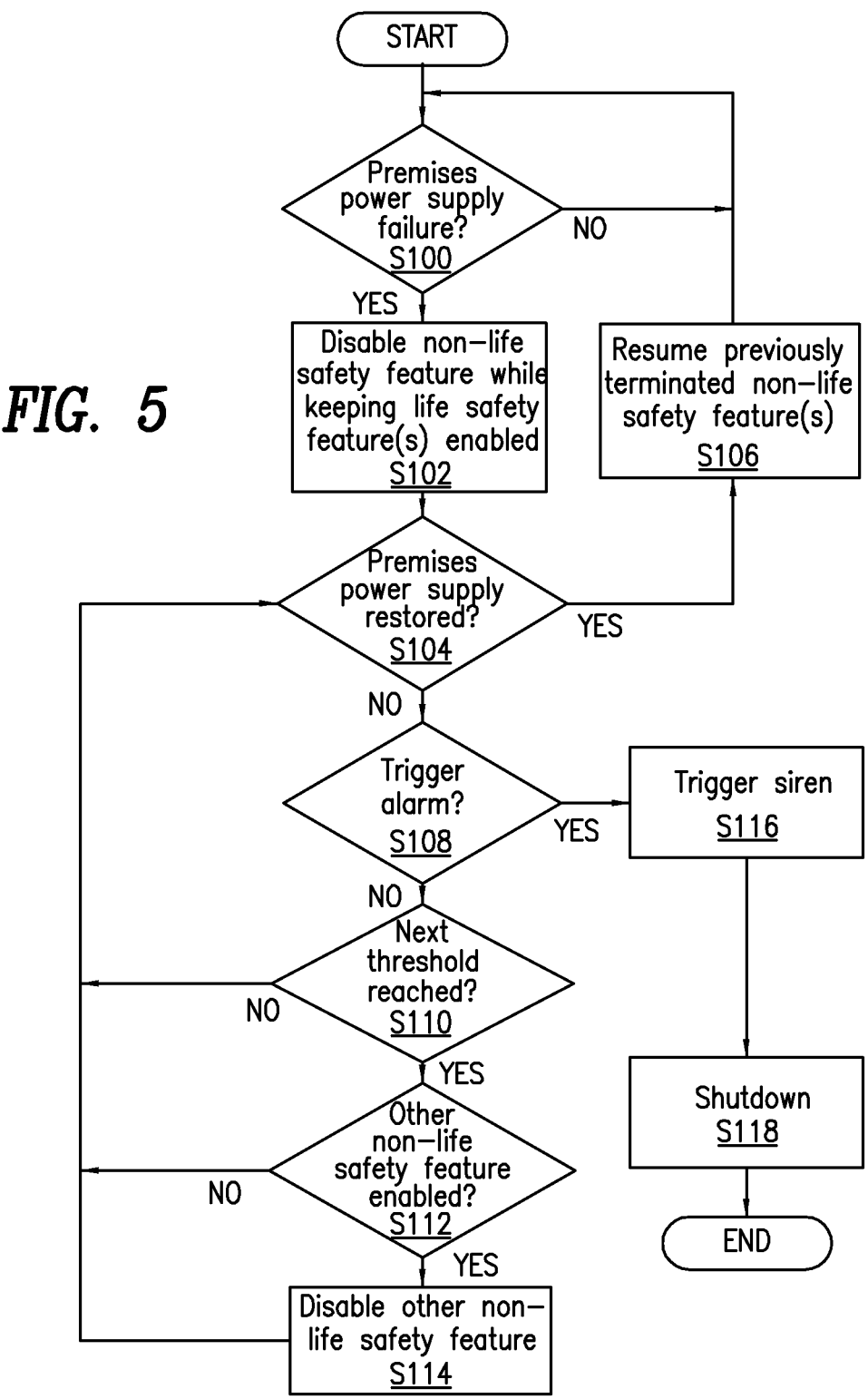
FIG. 5 is a flow chart of an example control unit power management process of the invention in accordance with the principles of the invention.

An example power management process is illustrated in FIG. 5. The power management process relates to managing a security system based at least in part on the monitoring of premises power supply 36 and back-up power supply 38. Processor 44 determines whether premises power supply 36 has failed (Block S100). For example, processor 44 may monitor the power being provided by premises power supply 36 using well known methods in the art to determine whether power failure has occurred. Power failure may occur when the voltage being supplied by premises power supply 36 falls below a predefined voltage threshold. If processor 44 determines a power failure has not occurred, the determination of Block S100 may be repeated.

If the determination is made that premises power supply 36 is in a power failure condition, processor 44 disables a non-life safety feature such as a life style feature, while keeping the life safety feature(s) enabled (Block S102). For example, the temperature control feature associated with the life style operating system may be disabled while keeping the intrusion detection, fire detection and carbon monoxide detection features associated with life safety operating system 50 enabled. Power management module 48 advantageously allows non-life safety features such as life style features associated with life style operating system 50 to be disabled without interrupting life safety features associated with life safety operating system 52. This configuration helps ensure life safety features will remain enabled during premises power supply 36 failure while at the same time reducing power consumed by disabling a non-life style feature. For example, some life style features may require or attempt to initiate communication with user interface device 12 and/or remote monitoring center 20 in which such communications consume power, i.e., may consume limited back-up power. Other non-life style features that may be disabled include turning off any security control device LEDs and/or terminating communications to user interface device 12 while maintaining communications with premises devices. Therefore, disabling at least one non-life safety feature reduces the amount of power consumed by control unit 16 in which the more non-life safety features that are disabled, the greater the power savings.

Processor 44 determines whether premises power supply 36 has been restored based at least in part on the monitoring of premises power supply 36 (Block S104). For example, processor 44 may continually or periodically monitor the power level of premises power supply 36 to determine whether the power level is equal to or above the predetermined voltage threshold. If processor 44 determines premises power supply 36 has been restored, processor 44 may resume or enable the previously disabled non-life safety feature(s) (Block S106). In other words, the power management process enables non-life safety features such as life style features that may consume more power once control device 16 is being power by premises power supply 36 such that the non-life safety features consume minimal power from the back-up power supply 38.

If the determination is made that power of premises power supply 36 has not been restored, a determination is made whether to trigger an alarm such as an audible alarm (Block S108). In particular, an audible alarm may be trigger after processor 44 determines control unit 16 has been operating on back-up power supply 38 for a predetermined amount of time, e.g., twenty-four hours. The predetermined amount of time may be based on design need and/or regulatory requirements. If the determination is made to trigger an alarm, siren 40 or siren 64 may be triggered for a predetermined amount of time (Block S116). In one embodiment, processor 44 uses communication subsystem 30 to send a siren trigger message to user interface device 12 to trigger siren 64 in user interface device 12. For example, siren 64 may be triggered for at least four minutes in order to alert a user of a control unit 16 status such as loss of all power. The predetermined amount of time the alarm is triggered may be based on design need and/or regulatory requirements. Other criteria may be used to trigger an audible alarm based on design need. After triggering siren 64, control unit 16 may shut down (Block S118). For example, control unit 16 may perform a graceful shutdown according to a shutdown routine when the back-up power supply 38 reaches a predefined threshold such as ten percent power remaining.

Referring back to Block S108, if processor 44 makes the determination not to trigger an alarm, processor 44 determines whether an available power threshold has been reached (Block S110). The power threshold may correspond to a back-up power supply 38 level at which another non-life safety feature may be shutdown in order to reduce power consumption. For example, a different non-life safety feature may be terminated every time the power level falls by a predetermined amount such as five or ten percent or to a predetermined level. Moreover, one or more non-life safety features may be terminated at a time. If the determination is made that the feature threshold is not reached, the determination of Block S104 may be repeated.

If the determination is made that the power threshold has been reached, processor 44 determines whether at least one other non-life safety feature, e.g., life style feature, is enabled (Block S112). For example, a lighting life style feature may have been previously been disabled in Block S102 but a temperature life style feature remains enabled. If the determination is made that at least one other non-life safety feature is not enabled, the determination of Block S104 may be repeated. If processor 44 determines at least one other non-life safety feature is enabled, processor 44 disables the at least one other non-life safety feature such that the non-life safety features consume less power from the back-up power supply 38 (Block S114). The order of which non-life safety features are disabled may vary based on design need and power consumption of individual features or other criteria. After disabling the at least one other non-life safety feature, the determination of Block S104 may be repeated. The power management process helps ensure more important or safety-dependent features stay powered by terminating or disabling less important features such as life style features. Alternatively, processor 44 may disable more than one or all non-life safety features at one time.

An example power management process for user interface device 12 is illustrated in FIG. 6. The power management process relates to managing user interface device 12 features based at least in part on the monitoring of power supply 66. For example, processor 56 may monitor the power being provided by power supply 66 using well known methods in the art. Processor 56 determines whether the power being supplied by power supply 66 drops below a predefined threshold based at least in part on the monitoring, i.e., whether a power supply 66 voltage or power level is less than a threshold (Block S120). The threshold may be a power and/or voltage level determined based on design need and/or other factors. If processor 56 determines power supply 66 is not below, i.e., greater than or equal to, a predetermined threshold, the determination of Block S120 may be repeated.

If the determination is made that the power supply 66 is below the predetermined threshold, processor 56 disables at least one non-safety feature while keeping life safety feature(s) enabled at user interface device 12 (Block S122). For example, processor 56 may disable a life style feature such that less power may be consumed by not having to perform processing, communication and/or other functions associated with the disabled feature. Other non-safety features may include a backlight keypad and/or display feature. Therefore, disabling at least one non-life safety feature reduces the amount of power consumed by user interface device 12 such that the more non-safety features that are disabled, the greater the power savings.

After at least one non-life safety has been disabled, processor 56 may determine whether power supply 66 is still below the threshold based at least in part on the monitoring (Block S124). For example, processor 56 may continually or periodically monitor the voltage level of power supply 66. If the determination is made that power supply 66 is not below the threshold (i.e., is greater than or equal to the threshold), processor 56 may resume the previously disabled or terminated non-safety feature(s) (Block S126). In other words, the power management process of FIG. 6 enables or executes the previously disabled non-life safety feature(s) that may consume more power once power supply 66 is greater than or equal to the threshold such that the non-life safety features consume minimal power from power supply 66. Power supply 66 may rise back to the predetermined threshold level when power supply 66 is being recharged and/or when user interface device 12 is being power via USB, among other situations where power supply 66 is no longer below the predetermined threshold. Alternatively, Blocks S124 and S126 may be skipped or excluded from the power management process of FIG. 6 based on design need, i.e., the process moves from Block S122 directly to Block S128.

If the determination is made that power supply 66 is below threshold, processor 56 determines whether to trigger an alarm such as an audible alarm (Block S128). In particular, an audible alarm may be trigger after processor 56 determines power supply 66 has reached a lower predetermined threshold. For example, the lower predetermined threshold may correspond to a minimum power level needed to trigger siren 64 for a predetermined amount of time and/or shutdown user interface device 12. The lower predetermined threshold may be based on design need. If the determination is made to trigger an alarm, siren 64 and/or siren 40 may be triggered for a predetermined amount of time (Block S136). For example, siren 64 may be triggered for at least four minutes in order to alert a user of user interface device 12 status such as a loss of all power status. The predetermined amount of time the alarm is triggered may be based on design need and/or regulatory requirements. Other criteria may be used to trigger an audible alarm based on design need. After triggering siren 64, user interface device 12 may shut down (Block S138). For example, control unit 16 may perform a graceful shutdown according to a shutdown routine.

Referring back to Block S128, if the determination is made not to trigger an alarm, processor 56 determines whether a feature threshold has been reached (Block S130). The feature threshold may correspond to a back-up power supply 38 level at which another feature may be shutdown in order to reduce power consumption. For example, a difference feature may be terminated every time the power level fails another predetermined amount, e.g., five or ten percent. Moreover, more than one feature may be disabled or terminated at a time. If the determination is made that the feature threshold is not reached, the determination of Step S124 may be repeated. Alternatively, if Block S124 is skipped or excluded from the process and the determination is made that the feature threshold not been reached, the determination of Block S128 may be performed.

If the determination is made that the feature threshold is reach, processor 56 determines whether at least one other non-life safety feature is enabled (Block S132). If the determination is made that at least one other non-life safety feature is not enabled, the determination of Block S124 may be repeated. Alternatively, if Block S124 is skipped or excluded from the process and the determination is made that at least one other non-life-style feature is not enabled, the determination of Block S128 may be repeated, i.e., the process moves from Block S132 to Block S128. If processor 56 determines at least one other non-life safety feature is enabled, processor 56 disables the at least one other life style feature such that the non-life safety features consume less power from power supply 66 (Block S134). The order of which non-life safety features are disabled may vary based on design need and power consumption of individual features or other criteria.

After disabling the at least one other non-life style feature, the determination of Block S124 may be repeated. Alternatively, if Block S124 is skipped or excluded from the process and the other non-life safety feature has been disabled at Block S134, the determination of Block S128 may be repeated, i.e., the process moves from Block S134 to Block S128. The power management process helps ensure more important or safety dependent features remain operating by terminating or disabling less important features such as life style features or other non-safety features at user interface device 12. Alternatively, processor 56 may disable more than one or all life style features at one time. In one embodiment, the power management is configured and power supply 66 sized such that processor 56 can still trigger and sound siren 64 for four minutes after a twenty-four hour period upon the occurrence of a triggering condition, e.g., low battery, sensor trigger detection, receipt of trigger message from control unit 16, etc.

In accordance with one embodiment, system 10 may be configured to authorize user interface device 12 to implement one or more sets of functionality as access profiles based on access criteria and determination of one or more access characteristics when user interface 12 is seeking access to control unit 16, such as when a mobile app is launched and needs to be authenticated to provide the user with a set of functionality for such access. Or, user interface device 12 may execute, i.e., "pop up", an application on user interface device 12 via interface 62 and/or display 67 for the user to manually actuate user interface 12 to request access.

Alternatively or in addition to a user initiated request, user interface device 12 may automatically trigger a request for access. For example, user interface device 12 may periodically request an access profile or updated access profile or it may occur automatically when the user launches an application on user interface 12. In this manner the functionality provided to user interface 12 may be accomplished entirely within system 10 and transparent to the user, so the user simply experiences a different set of functions automatically depending on the status of the various access characteristics of device of user interface device and the analysis of those characteristics by the system.

Figure 7:
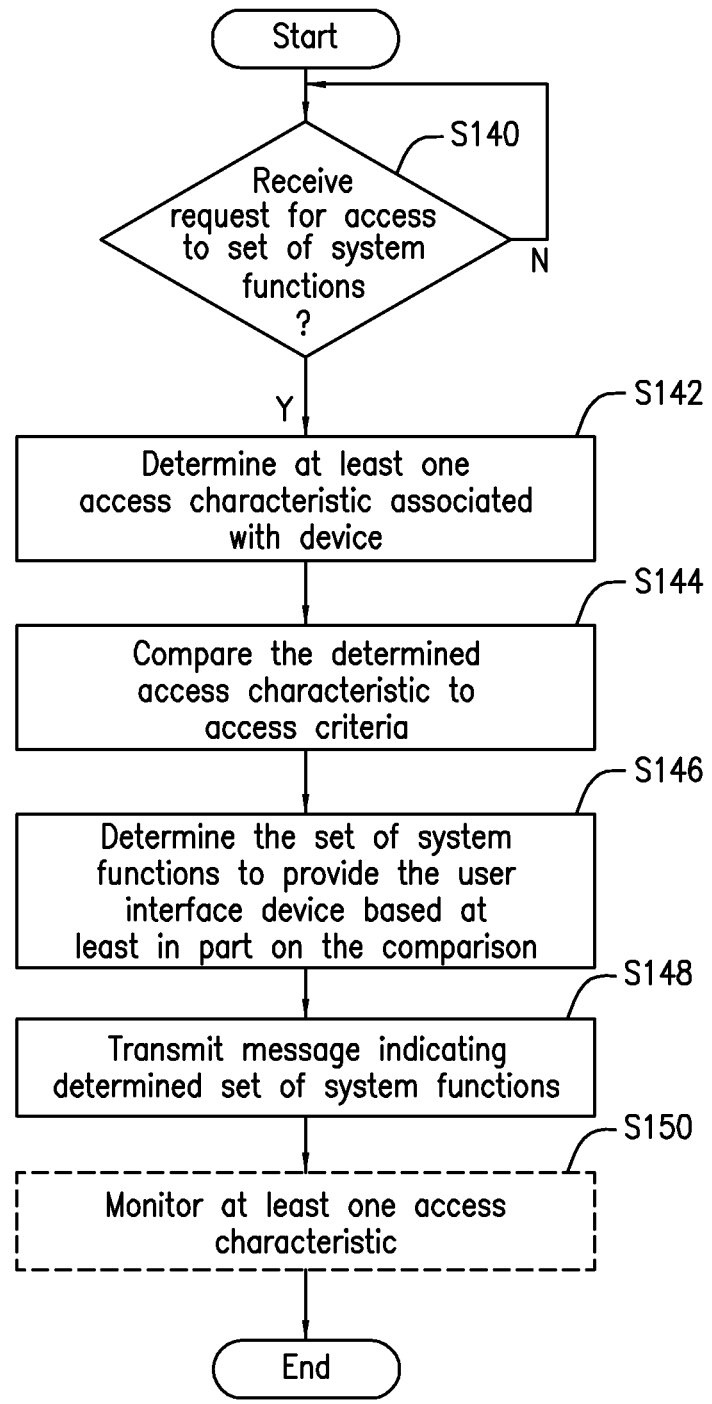
FIG. 7 is a flow chart of an example access profiles process of the invention in accordance with the principles of the invention.

An example access profile process is described with reference to FIG. 7. Processor 44 of control unit 16 may determine if a request message for access has been received (Block S140). If processor determines a request message for an access profile has not been received, processor 44 continues to perform the determination of Block S140.

If processor 44 determines a request for an access profile has been received from user interface device 12, processor 44 determines at least one access characteristic associated with requesting user interface device 12 (Block S142). For example, processor 44 may determine at least one of a location type, device type, device identification, connection type and user type, etc. among other various attributes previously noted. In one embodiment, processor 44 may be preconfigured with at least one access characteristics such as device type. Alternatively or in addition to preconfiguring control unit 16 with knowledge of user interface device 12, processor 44 may dynamically determine at least one access characteristic of user interface device 12 such as location type, connection type, etc. For example, processor 44 may determine location type of requesting user interface device 12, i.e., determine user interface device 12 is proximate the premises, inside the premises or remote from the premises. In one example, the determination of the access characteristic incorporates geo-fencing based at least one of proximate physical location and network connection type.

In another example, processor 44 may determine at least one access characteristic based at least in part on data received the request message such as device identification, user identification, connection type and/or location, among other characteristics. A device identification may include a media access control (MAC) address, international mobile station equipment (IMEI) number and/or an identifier generate by software operating on the user interface, among other device identifiers.

In another example, processor 44 may determine a connection type such as wired, wireless or broadband that user interface device 12 is using to communicate with control unit 16. In another example, processor 44 may determine the user type associated with user interface device 12 such as a master user or guest user. The user type may be based at least in part on an authorization code received from user interface device 12. Alternatively or in addition to processor 44 determining at least one access characteristic of requesting user interface device 12, the determination of at least one access characteristic may be made by remoter server 22, user interface device 12 and/or remote monitoring center 20. The determined at least one access characteristics may be transmitted to control unit 16 for access profile determination.

Processor 44 compares the determined access characteristic to access criteria (Block S144). Processor 44 determines the set of system functions to provide to user interface device 12 based at least in part on the comparison (Block S146). In one embodiment, processor 44 determines which one of a stored plurality of access profiles user interface device 12 is to implement based at least in part on the determined at least one access characteristic. For example, processor 44 may restrict access to video camera functions if the determined access characteristics indicate the connection type is not broadband and/or the device type is a mobile phone with low computational resources. In another example, processor 44 may restrict access to "STAY" security system arming option, which is used when a user is at the premises, if the determined access characteristic indicates the location type is remote from premises, i.e., request user interface device 12 is remote from premises. Other examples are described below with reference to FIGS. 9-19. In another example, a different access profile may be implemented for each of a plurality of premises associated with a user device, i.e., based on location. This may be the case where a user manages multiple stores such that user devices device 12 implements a different access profile each store.

Processor 44 transmits a message indicating the determined set of system functions (Block S148). The message may be transmitted toward user interface device 12. The message may include access data 71 corresponding to a specific access profile. For example, the access data 71 may include system functions to make available and/or system functions not to make available. In one embodiment, access data 71 in the message lists system functions not to make available such the non-listed system functions are made available. In another embodiment, access data 71 in the message lists system functions to make available such non-listed system functions are not made available. Message may include other indications as to which system functions to make available and/or unavailable to user interface device 12. In one embodiment, the set of functions is automatically provided to the user interface device upon determination of the access characteristic, and includes a prompt for the user to perform at least one of arm the premises based system, disarm the premises based system, unlock a door of the premises, and turn on at least one light within the premises.

Processor 44 monitors the determined at least one access characteristic (Block S150). In one embodiment, processor 44 may periodically perform Blocks S142-S146 and transmit an updated message to user interface device (Block S148) if another access profile is to be implemented. The monitoring at Block S150 allows processor 44 to dynamically reduce, maintain or increase access to system functionality as the at least one access characteristic changes. Alternatively, Block S150 may be skipped or omitted based on design implementation.

In another embodiment, the determination of the access characteristics, comparison with the access criteria, and determination of the set of functionality for user interface device 12 may be accomplished using a processor in remote server 22, and/or processor 56 of user interface device 12 itself. In one example, processor 56 determines whether a notification to request such functionality (based on access criteria, such as an access profile) has been received (Block S152). If processor 56 determines a notification to request access has not been received, processor 56 continues to or periodically performs the determination of Block S152. If processor 56 determines that a notification to request access has been received, processor 56 causes a request message for access to be transmitted (Block S154). The request message may include data such as device identification, device location, user identification and/or connection types, among other data that may be determined by user interface device 12, or otherwise obtained by control unit 16 or remote server 22. The data in the request message may be used to determine one or more access characteristics of user interface device 12, as discussed with respect to FIG. 7. Processor 56 determines whether a response to the request for access has been received (Block S156). If an access profile has not been received, processor 56 may perform the determination of Block S156. If processor 56 determines an access profile has been received, processor 56 causes one or more system functions to be made available to user of user interface device 12 based at least in part on the received access profile (Block S158).

In one embodiment, user interface device 12 may receive an access profile from control unit 16, remote monitoring center 20 and/or remote server 22 that contains a set of system functions to make available to the user. In another embodiment, user interface device 12 may store a plurality of access profiles in memory 58 each having sets of functionality, such that the received access profile indicates which one of the stored plurality of access profiles to implement.

Processor 56 may determine a connection type for user interface device 12 as being authenticated on the local WiFi network for the premise, and, based on the stored access criteria 71, may enable user interface 12 to communicate locally with control unit 16 at the premises via wireless communication element 32, e.g., through the local Wi-Fi network at the premises, without the need to communicate with a remote server 22 or remote monitoring center 20. In this case, the communication between user interface device 12 and control unit 16 is entirely local to the premises. As such, in addition to use for access profile and system functionality determination, user interface device 12 can be used to locally control the operation of, i.e., operate and configure, control unit 16. Access data 71 and any incorporated user access profile may also distinguish based on device type as well, e.g., may only allow such local communication if user interface 12 is a mobile device, e.g., phone or tablet, as opposed to other devices such as a PC or a touch screen for control unit 16—and based on the device identifier—e.g., may only allow certain "known" mobile devices to communicate locally. This arrangement reduces latency associated with communications between user interface device 12 and control unit 16 as compared with communications between user interface device 12 and control unit 16 that occur via a remote server 22 or remote monitoring center 20.

Figures 9, 10:
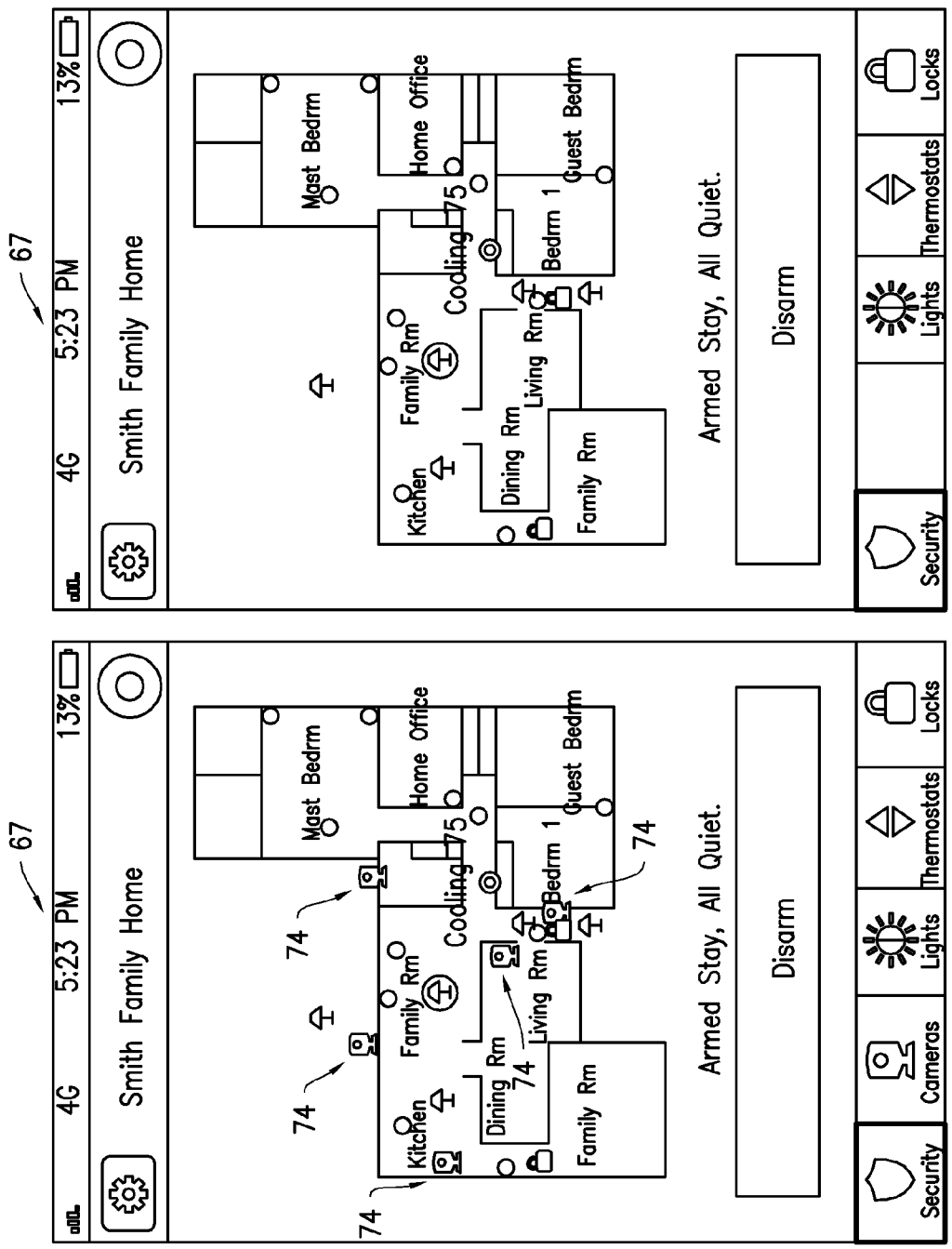
FIGS. 9 and 10 are example views of an interface and/or display on a user interface device providing different camera functions in accordance with the principles of the invention.

FIGS. 9 and 10 illustrate example access profiles in which user interface device 12 is provided with or restricted from system functions. In particular, access to cameras at the premises may be granted or restricted based at least in part on at least on access characteristic. In one embodiment, an implemented access profile may restrict access to the cameras via a mobile phone application or for certain devices (device type) unless user interface device 12 is in the premises (location type). In another embodiment, an implemented access profile may allow access to the cameras via a mobile phone application or for certain devices (device type) unless user interface device 12 is in the premises (location type) since there may be no need for camera access while at home (premises). FIG. 9 corresponds to an access profile that allows access to cameras, i.e., interactive camera icons 74 are present, while FIG. 10 corresponds to an access profile that does not allow access to cameras, i.e., interactive camera icons 74 are not present.

Figures 11, 12:
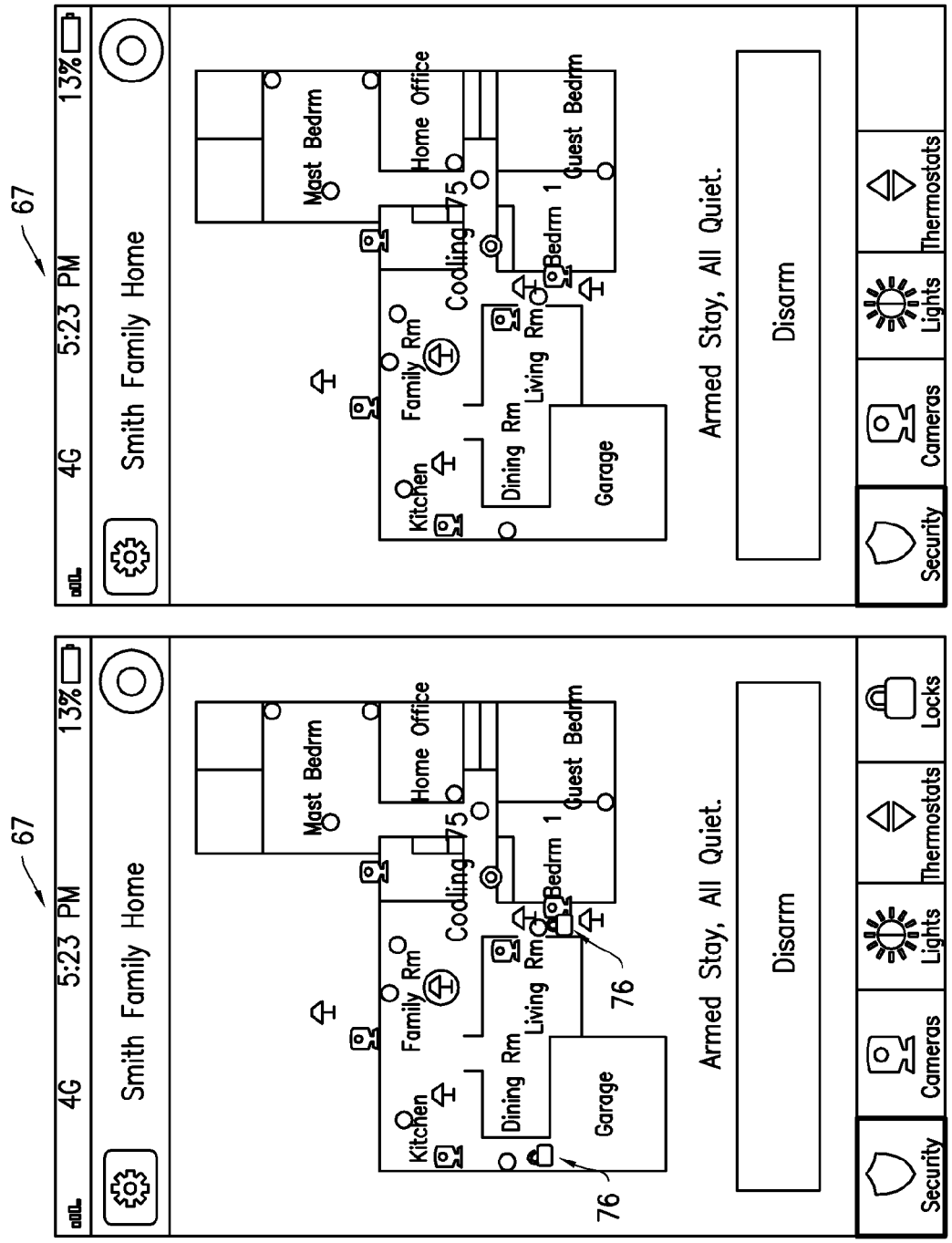
FIGS. 11 and 12 are example views of an interface and/or display on a user interface device providing different door lock functions in accordance with the principles of the invention.

FIGS. 11 and 12 illustrate example access profiles in which user interface device 12 is provided with or restricted from certain system functions. Access to an interactive icon for modifying electronic door locks (premises devices 14) at the premises may be granted or restricted based at least in part on at least on access characteristic. In one embodiment, an implemented access profile may provide access to an interactive icon for modifying door locks on a mobile phone application or certain devices (device type) if user device 12 is proximate the premises (location type). This access profile is illustrated in FIG. 11 where the interactive door lock icons are illustrated. In another embodiment, the implemented access profile may restrict access to interactive icons 76 for modifying door locks via certain devices (device type) if user interface device 12 is in the premises. The access profile that restricts access to door locks is illustrated in FIG. 12 in which the interactive door lock icons 76 are not present.

FIGS. 13 and 14 illustrate example access profiles in which user interface device 12 is provided with or restricted from system functions. Access to icons for viewing images/video from internal cameras (premises devices 14) at the premises may be granted or restricted based at least in part on at least on access characteristic. In one embodiment, an implemented access profile may provide access to icons for viewing images/video from internal cameras on a mobile phone application or certain devices (device type) and/or if user device 12 is remote the premises (location type). This access profile is illustrated in FIG. 13 where the interactive internal camera icons 78 are illustrated. In another embodiment, the implemented access profile may restrict access to icons for viewing images/video from internal cameras for certain devices (device type) and/or if user interface device 12 is in the premises, e.g., there may be no need for internal camera view if user is home. The access profile that restricts access to icons for viewing images/video from internal cameras is illustrated in FIG. 14 in which the interactive internal camera icons 78 are not illustrated, i.e., a user cannot selective the internal cameras.

FIGS. 15 and 16 illustrate example access profiles in which user interface device 12 is provided with or restricted from system functions. Access to icons for one or more alarm settings may be granted or restricted based at least in part on at least on access characteristic. In one embodiment, an implemented access profile may provide access to icons for both Arm Away and Arm Stay 80 settings if user device 12 is proximate or inside the premises (location type). This access profile is illustrated in FIG. 15 where the interactive arming icons are illustrated. In another embodiment, the implemented access profile may restrict access to the icon for Arm Stay 80 setting if user interface device 12 is remote from the premises (location type). The access profile that restricts access to the icon for the Arm Stay 80 setting is illustrated in FIG. 16 in which the interactive Arm Stay icon is not displayed.

Figure 18:
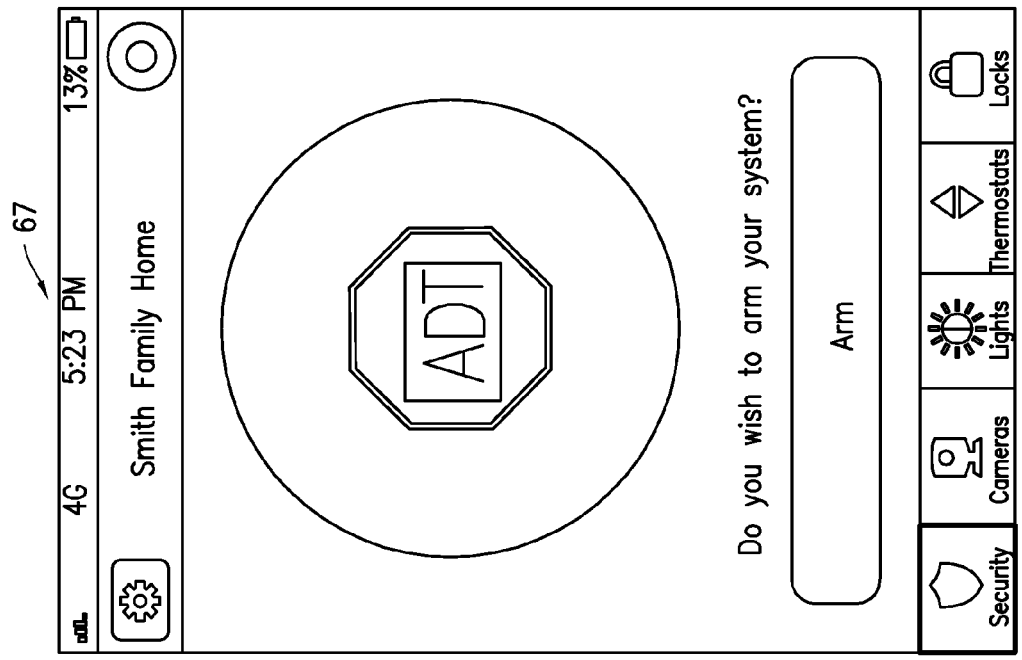
FIGS. 17 and 18 are example views of an interface and/or display on a user interface device providing different monitored arming functions in accordance with the principles of the invention.
Figure 17:
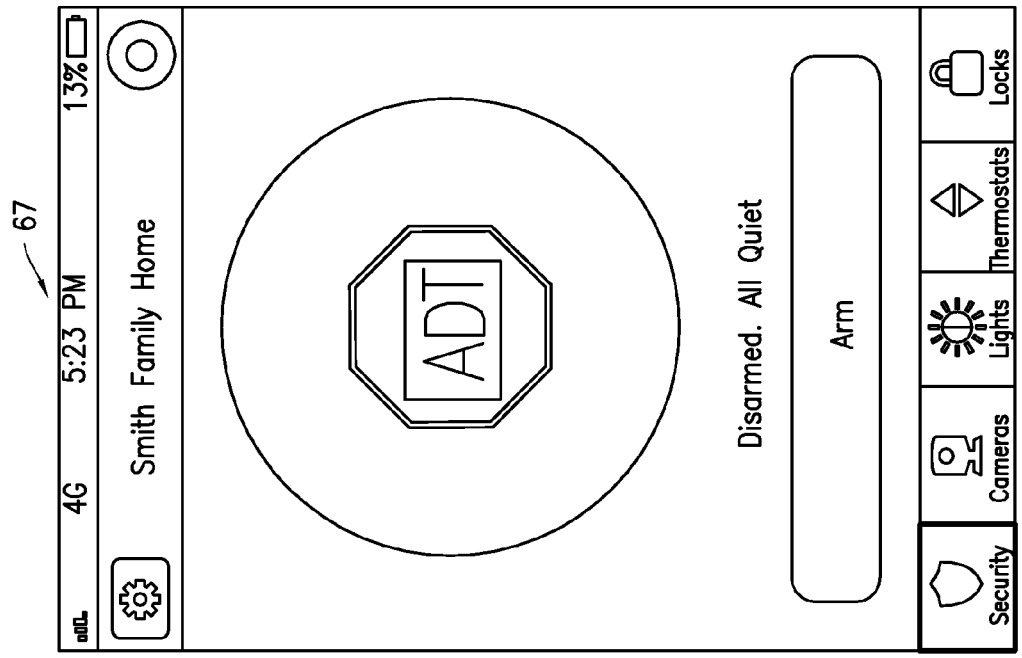

FIGS. 17 and 18 illustrate example access profiles in which user interface device 12 is provided with or restricted from system functions. Access to icon for monitored arming functionality may be granted or restricted based at least in part on at least on access characteristic. In one embodiment, an implemented access profile may provide access to icon for arming functionality on a mobile phone application (device type) if user device 12 transitions from in the premises to proximate the premises (location types). For example, a user with user interface device 12 may be leaving the premises such that the mobile application prompts user to arm the premises. This access profile is illustrated in FIGS. 17 and 18. In another embodiment, the implemented access profile may restrict access to icon for monitored arming functionality for certain devices (device type) such as a tablet even if user interface device 12 transitions from in premises to proximate premises (location types).

Figure 19:
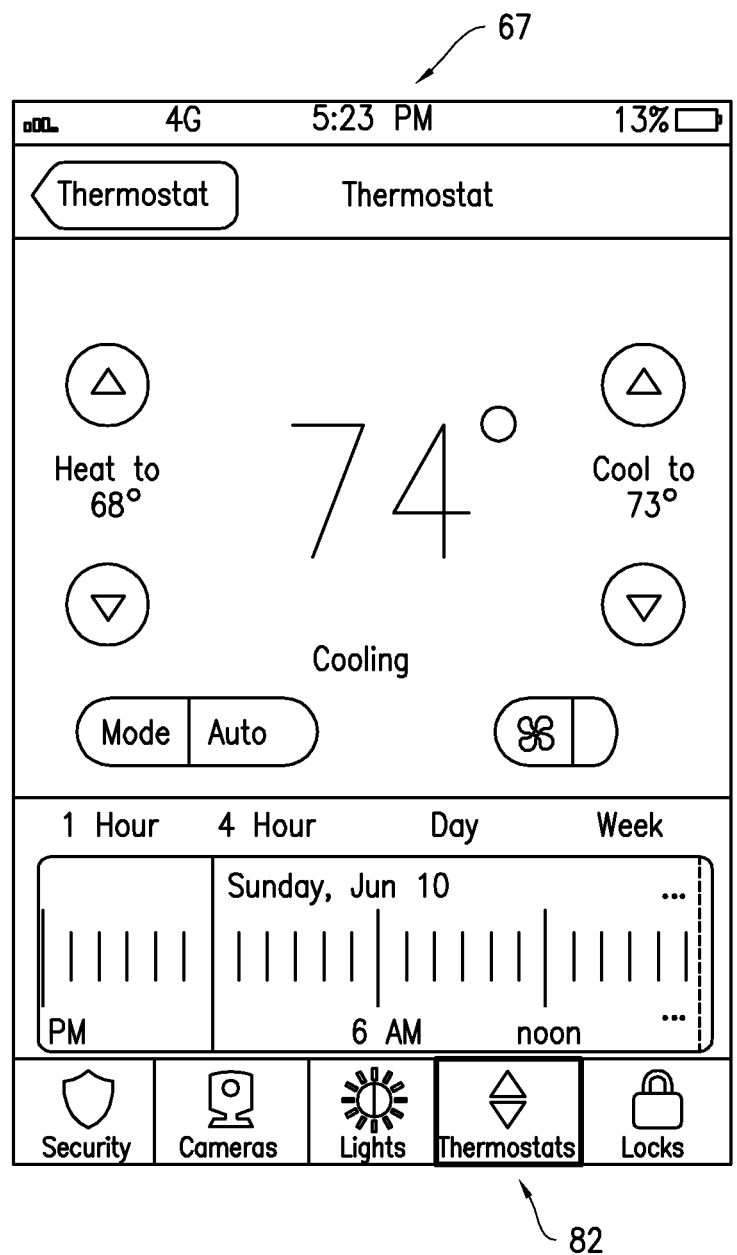
FIG. 19 are example views of an interface and/or display on a user interface device providing different thermostat functions in accordance with the principles of the invention.

FIG. 19 illustrates an example access profile in which user interface device 12 is provided with or restricted from system functions. Access to icons for thermostats functionality at the premises may be granted or restricted based at least in part on at least on access characteristic. In one embodiment, an implemented access profile may provide access to icons such as 82 for thermostat functionality if user device 12 has authorization (user type). For example, thermostat functionality of a store premises may only be provide to higher level users. This access profile is illustrated in FIG. 19 where the interactive thermostat functionality is displayed on user interface device 12. In another embodiment, the implemented access profile may restrict access to icons such as 82 for thermostat functionality for lower level users of user interface device 12 is in the premises.

The menus and icons corresponding to system functions are made available to the user via user interface device 12 depending on which access profile is implemented by user interface device 12. The access profile chosen for user interface device 12 is based on at least one access characteristic such as location, device type and/or connection type, among other processor determinable characteristics associated with user interface device 12.

Accordingly, the invention may control access to a premises based using the aforementioned combinations of various access criteria stored, for example, in memory 46 of control unit 16, a memory or other storage on remote server 22, or even in the memory of user interface 12, to establish a set of system functions that may be provided as an access profile for accessing the system through user interface 12; using a processor such as processor 44 or processor 56 and/or another, to determine an access characteristic associated with the user interface device, comparing the access characteristic to the access criteria, and determining the set of system functions to provide the user interface based at least in part on the comparison.

The access characteristic may include proximate physical location, a connection type for communicating with the user interface device, a device type for the user interface device, an identifier for the user interface device, user type, time of day, and current state of the system. The proximate physical location may be determined, for example, by using triangulation, global position system (GPS), Wi-Fi communications and cellular base station communications.

The identifier may be any number of identifiers such as IP address, MAC address, an IMEI number, or an identifier generated by software operating on the user interface device. The connection type may be a number of wireless communication protocols, including Bluetooth, ZigBee, Z-Wave, Wi-Fi, and cellular.

The set of functions may be automatically provided to user interface 12 upon determination of the access characteristic, and may include a prompt for the user to perform at least one of arm the premises based system, disarm the premises based system, unlock a door of the premises, and turn on at least one light within the premises. This may be accomplished, for example, through geo-fencing based at least one of proximate physical location and network connection type.

The communication subsystem may be configured to enable communication between the premises based system and the user interface device using a particular connection type based on the determined access characteristic.

One or more of the processors may be further configured to automatically authenticate user interface device 12 based on comparison of the determined access characteristic and the access criteria. It may also be configured, based on the comparison of the determined access characteristic and the access criteria, to automatically perform, or prompt the user to perform, at least one of arm the premises based system, disarm the premises based system, unlock a door of the premises, and turn on at least one light within the premises.

The invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An apparatus for controlling access to a premises based system, the apparatus comprising:
    a communication subsystem configured to communicate with a user interface device through which a user is able to access an established set of at least one of life style functions and life safety functions of the premises based system;
    a memory configured to store access criteria for establishing the set of at least one of life style functions and life safety functions that are accessible through the user interface device; and
    a processor configured to:
        determine at least one access characteristic associated with the user interface device;
        compare the determined access characteristic to the access criteria;
        establish the set of at least one of life style functions and life safety functions to provide the user interface based at least in part on the comparison of the determined at least one access characteristics to the access criteria;
        restrict at least one of a different life style function and life safety function from the established set of at least one of life style functions and life safety functions from being provided to the user interface based at least in part on the comparison of the determined at least one access characteristic to the access criteria;
        automatically provide to the user interface device the established and non-restricted at least one of life style functions and life safety functions upon the establishing the set of at least one of life style functions and life safety functions and the restricting at least one of a different life style function and life safety function, and includes a prompt for the user to perform at least one of arm the premises based system, disarm the premises based system, unlock a door of the premises, and turn on at least one light within the premises; and
    the determination of the at least one access characteristic incorporates geo-fencing based at least one of proximate physical location and network connection type.

2. The apparatus of claim 1, wherein the access criteria is defined at least in part by an access profile containing a pre-determined set of the at least one of life style functions and life safety functions.

3. The apparatus of claim 1, wherein the at least one access characteristic includes a device type, the device type is one of a personal computer, a wireless touch screen, a tablet device, and a mobile phone.

4. The apparatus of claim 1, wherein the at least one access characteristic includes a proximate physical location of the user interface device with respect to the premises based system to which the set of at least one of life style functions and life safety functions have been established.

5. The apparatus of claim 4, wherein the proximate physical location is determined using a global positioning system (GPS).

6. The apparatus of claim 1, wherein the at least one access characteristic includes an identifier, the identifier is at least one of a media access control (MAC) address, an international mobile station equipment (IMEI) number, and an identifier generated by software operating on the user interface device.

7. The apparatus of claim 1, wherein the communication subsystem is configured to enable communication between the premises based system and the user interface device using a particular connection type based on the determined access characteristic.

8. A method for an apparatus for a premises based system, the method comprising:
communicating with at least one user interface device through which a user is able to access an established set of at least one of life style functions and life safety functions of the premises based system;
storing access criteria for establishing the set of at least one of life style functions and life safety functions that are accessible through the user interface device;
determining at least one access characteristic associated with the user interface device;
comparing the determined access characteristic to the access criteria; and
establishing the set of at least one of life style functions and life safety functions to provide the user interface based at least in part on the comparison of the determined access characteristics to the access criteria;
restricting at least one of a different life style function and life safety function from the established set of at least one of life style functions and life safety functions from being provided to the user interface based at least in part on the comparison of the determined at least one access characteristic to the access criteria;
automatically providing to the user interface device the established and non-restricted at least one of life style functions and life safety functions upon the establishing the set of at least one of life style functions and life safety functions and the restricting at least one of a different life style function and life safety function, and includes a prompt for the user to perform at least one of arm the premises based system, disarm the premises based system, unlock a door of the premises, and turn on at least one light within the premises; and
the determination of the at least one access characteristic incorporates geo-fencing based at least one of proximate physical location and network connection type.

9. The method of claim 8, wherein the criteria is defined at least in part by an access profile containing a predetermined set of the at least one of life style functions and life safety functions.

10. The method of claim 8, wherein the at least one access characteristics includes a device type, the device type is one of a personal computer, a wireless touch screen, a tablet device, and a mobile phone.

11. The method of claim 8, wherein the at least one access characteristic includes a proximate physical location of the user interface device with respect to the premises based system to which the set of at least one of life style functions and life safety functions have been established.

12. The method of claim 11, wherein the proximate physical location is determined using GPS.

13. The method of claim 8, wherein the at least one access characteristic includes an identifier, the identifier is at least one of a media access control (MAC) address, an international mobile station equipment (IMEI) number, and an identifier generated by software operating on the user interface device.

14. The method of claim 8, further comprising enabling communication between the premises based system and the user interface device using a particular connection type based on the determined access characteristic.

15. An apparatus for controlling access to a premises based system, the apparatus comprising:
a communication subsystem configured to communicate with a user interface device through which a user is able to access an established set of at least one of life style functions and life safety functions of the premises based system;
a memory configured to store access criteria for establishing the set of at least one of life style functions and life safety functions that are accessible through the user interface device; and
a processor configured to:
determine at least one access characteristic associated with the user interface device that includes a connection type for the user interface device;
compare the determined access characteristic to the access criteria; and
establish the set of at least one of life style functions and life safety functions to provide the user interface device based at least in part on the comparison of the determined access characteristics to the access criteria;
restrict at least one of a different life style function and life safety function from the established set of at least one of life style functions and life safety functions from being provided to the user interface based at least in part on the comparison of the determined at least one access characteristic to the access criteria;
based on the comparison of the determined access characteristic and the access criteria, automatically one of prompt the user to perform, at least one of arm the premises based system, disarm the premises based system, unlock a door of the premises, and turn on at least one light within the premises; and
the determination of the at least one access characteristic incorporating geo-fencing based at least one of proximate physical location and network connection type.

16. The apparatus of claim 15, wherein the processor is configured to automatically authenticate the user interface device with the apparatus based on comparison of the determined access characteristic and the access criteria.

* * * * *